Feb. 7, 1939.  J. M. OLDHAM  2,146,128
CLINCH-ON NUT
Filed May 27, 1938   2 Sheets-Sheet 1
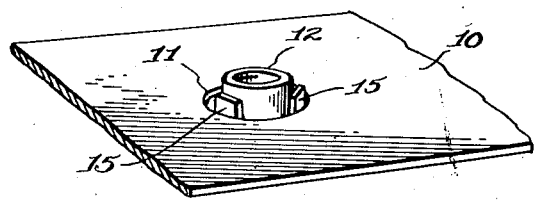
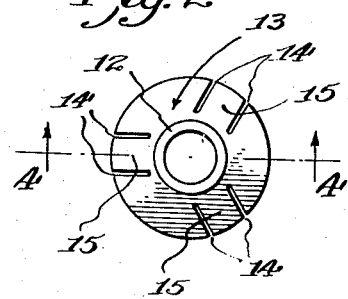
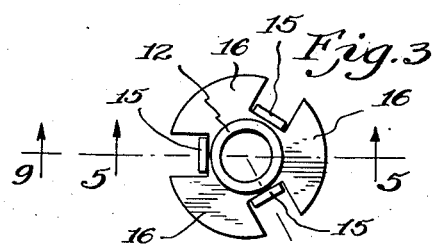
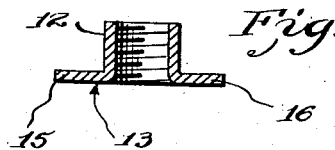
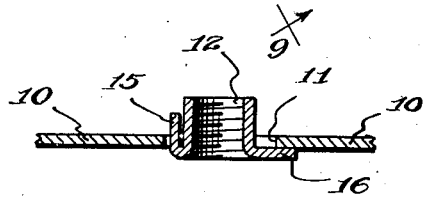
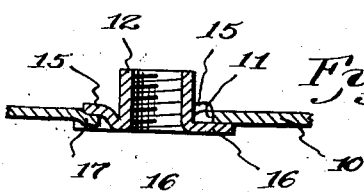
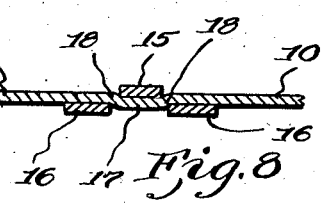
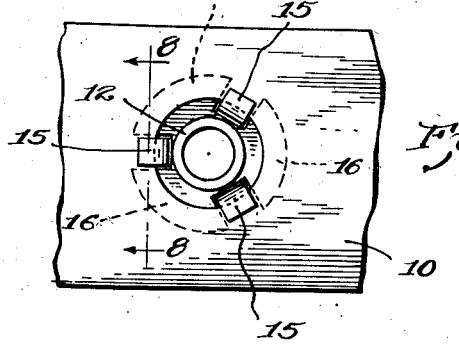
INVENTOR.
John M. Oldham
BY
Barnes, Kisselle, Laughlin & Raisch
ATTORNEYS Feb. 7, 1939.  J. M. OLDHAM  2,146,128
CLINCH-ON NUT
Filed May 27, 1938  2 Sheets-Sheet 2
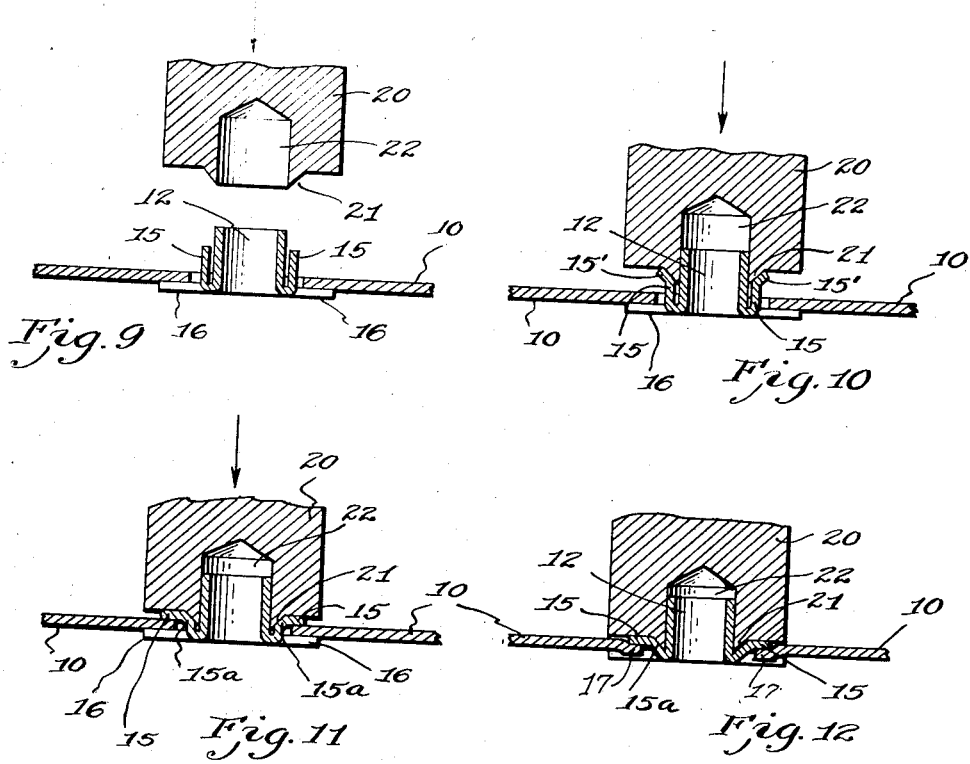
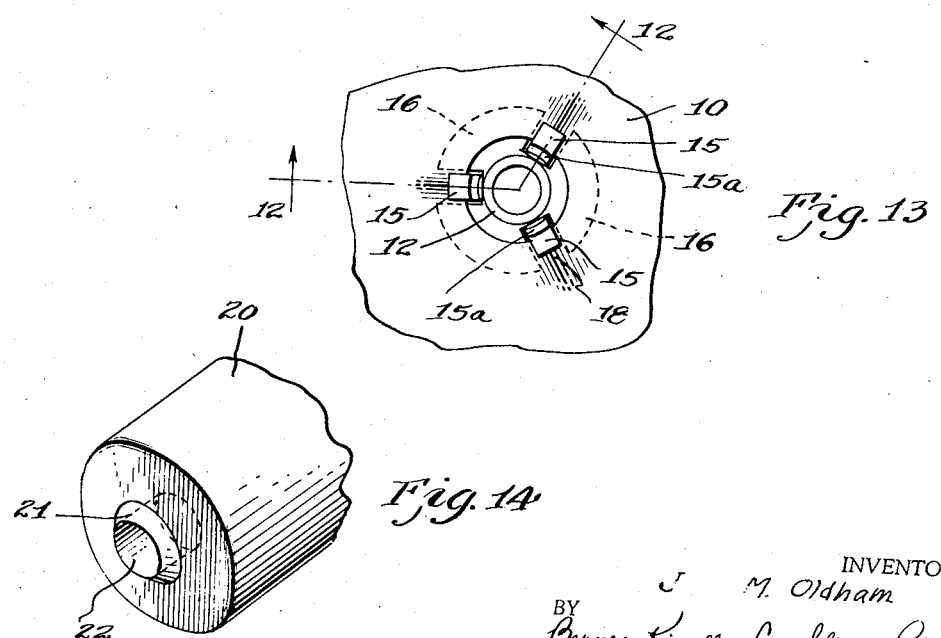
INVENTOR.
J. M. Oldham
BY
Barnes, Kisselle, Laughlin & Raisch
ATTORNEYS Patented Feb. 7, 1939

2,146,128

UNITED STATES PATENT OFFICE 2,146,128

CLINCH-ON NUT

John M. Oldham, Pleasant Ridge, Mich., assignor to L. A. Young, Detroit, Mich.

Application May 27, 1938, Serial No. 210,322

7 Claims. (Cl. 85—32)

This invention relates to threaded clinch-on nuts and has particularly to do with that type of nut which is formed entirely of sheet metal, by drawing and tapping a portion thereof and providing the same with a flange.

This type of nut is generally old but in the past it has been customary to form the holes through which the threaded portion of the nut is inserted, with a square or D-shaped configuration to prevent the nut from turning in the hole.

An object of the present invention is to provide a clinch-on nut which may be readily used in a round hole and which is so arranged that when inserted in its place, it will not turn in the hole. This result may be accomplished by reason of the unusual design of the nut.

Other objects and features of the invention having to do with details of design and fabrication will be further brought out in the following description.

In the drawings:

Fig. 1 is a perspective view of the nut as located in a hole prior to the clinching of the same.

Fig. 2 is a plan view of the nut in the process of its manufacture.

Fig. 3 is a plan view of the nut showing a second stage in the manufacture.

Figs. 4 and 5 are sections taken on the lines 4—4 and 5—5 of Figs. 2 and 3, respectively.

Fig. 6 is a cross section of the nut in clinched position.

Fig. 7 is a plan view of the nut in its operative position.

Fig. 8 is a section taken on the lines 8—8 of Fig. 7.

Fig. 9 is a section taken on the lines 9—9 of Fig. 3 and illustrates a punch about to strike the nut into the locked in position.

Figs. 10 and 11 are additional steps in the method of distorting the nut and the sheet metal to lock it into position.

Fig. 12 is a section taken on the line 12—12 of Fig. 13 showing the final position of the punch.

Fig. 13 is a plan view of a modified lock nut produced by the punching operation illustrated in Figs. 9 to 12.

Fig. 14 is a perspective of the punch used to form the modified nut.

Referring to the drawings, a piece of sheet metal 10 is shown with a circular aperture 11. Referring to Figs. 2 and 4, it will be seen that the clinch-on nut contemplated by the present invention is the type formed from a piece of sheet metal, a portion of the metal being gradually extruded by a drawing process to form the central portion 12 of the nut which is tapped to receive the threaded shank of a screw. A circular flange 13 is formed radially of the central portion 12. In the drawings the flange is formed at the base of the threaded portion of the nut though it need not necessarily be formed at this point. After the circular flange is formed, it is provided with slits 14 which permit lugs 15 to be struck from the flange parallel to the central portion 12. This leaves segmental portions 16 extending radially from the portion 12 to form the base of the nut, slots being formed of course, between the portions 16.

In inserting the nut into position, the central tapped portion 12 and the lugs 15 are passed up through the aperture 11 as shown particularly in Figs. 1 and 5. The lugs 15 are then bent over the margin of the aperture and pressed down toward the base members 16 with a sufficient force that the margin of the aperture 11 will be distorted, as shown at 17 in Figs. 6 and 8. The margin of the aperture 11 is thereby corrugated in such a manner that there will be no possibility of the nut turning in the hole.

It will be understood that if it is found desirable, the lugs 15 may be struck away from the central drawn or extruded portion 12 rather than toward it. Both modifications are within the scope of the present invention.

The particular feature of the invention which permits the positioning of the clinch-on nut in the apertures so that it will not rotate therein, rests in the design of the flange formed in the nut. Referring to Fig. 8, for example, it will be seen that as the lug 15 is pressed down toward the base member 16, a shearing force is exerted on the plate 10 at the points 18. This shearing force causes the distortion of the metal into the slots from which the lugs have been struck. The margin of the aperture is thus corrugated.

In Figs. 9 to 12 and 14 I have shown views of a punch 20 which may be used to distort the lugs 15 of the nut and also the sheet metal in which the nut is to be locked. It will be seen that the punch 20 is provided with an annular tapered portion 21 surrounding a central aperture 22 which is adapted to receive the central portion 12 of the nut.

Figs. 9, 10 and 11 have been taken on the lines 9—9 of Fig. 3 to more clearly illustrate the forming operation. Referring to Fig. 10, it will be seen that as the punch 20 comes down on the nut, the top portions 15' of the lugs 15 are bent outwardly by the annularly tapered ring 21. As the punch proceeds downward, as shown for example in Fig. 11, the portion 15a is subjected to a riveting or upsetting force which cold works or crushes the lugs as the punch is forced downward. as shown in Fig. 11, the punch has reached a position whereby the lugs 15 are contacting the top surface of the sheet metal 10, but have not yet distorted it. Support is, of course, furnished to the base portions 16 of the nut so that, as the punch 20 is forced further downward, the portions 17 of the sheet metal are distorted as previously described. See, for example, Fig. 8. The resulting nut is, as shown in Fig. 13, wherein with the riveted or upset lugs 15, firmly held in place in the round aperture. By this upsetting or crushing action shown in Figs. 9 and 12, I have avoided the spring up of the lugs 15 after they are pressed downward. Consequently, the nut is always firmly held in position and cannot rattle.

What I claim is:

1. In combination with a circularly apertured metal sheet, a clinch-on nut comprising a central drawn sleeve portion passed through the aperture and inwardly tapped to receive a screw, a radially extending flange on said drawn portion, and circumferentially spaced lugs struck from said flange and passing through said aperture, said lugs being bent over the margins of said aperture and pressed down toward said flange whereby to distort the metal forming the margin of said aperture to render the nut non-rotatable in said aperture.

2. A sheet metal nut formed from a piece of sheet metal comprising a central drawn sleeve portion tapped for receiving a screw and adapted to be passed through a circular aperture in a sheet of metal, a flange on said drawn portion adapted to contact with one side of said sheet of metal, spaced lugs struck out of said flange portion and extending through said aperture in said sheet metal, said lugs being adapted to be distorted toward said flange whereby to distort and sink into the margins of the sheet metal surrounding said aperture to prevent the nut from turning therein.

3. In combination with a circularly apertured metal sheet, a clinch-on nut comprising a central drawn portion inwardly tapped to receive a screw, a radially extending flange on said drawn portion, and spaced lugs struck from said flange and passing through said aperture, said lugs being crushed toward said flange whereby a portion of each lug overlaps and sinks into the margin of said aperture to render the nut immovable therein.

4. In combination with an apertured metal sheet, a clinch-on nut comprising a central drawn portion inwardly tapped to receive a screw, a radially extending flange on said drawn portion, and spaced lugs struck from said flange and passing through said aperture, said lugs being crushed toward said flange whereby a portion of each lug overlaps the margin of said aperture, the portion of said margin underlying each of said lugs being distorted into apertures in said flange formed by the striking out of the lugs.

5. In combination, a sheet metal piece having an aperture, and a clinch-on nut comprising an extruded portion tapped to receive a screw, a radially extending flange on said central portion contacting said sheet metal, circumferentially spaced lugs struck from said flange forming radially extending notches therein, said lugs being passed through said aperture, bent over the margin thereof, and pressed toward said flange whereby portions of said sheet metal are distorted into said notches to render said nut immovable in said aperture.

6. In combination, a sheet metal piece having an aperture, and a clinch-on nut comprising a drawn portion tapped to receive a screw, a radially extending flange on said central portion contacting said sheet metal, circumferentially spaced lugs struck from said flange forming radially extending notches therein, said lugs being passed through said aperture, bent over the margin thereof, and pressed toward said flange whereby portions of said sheet metal are distorted into said notches, said lugs serving as clamping means to grip the margin of said aperture in cooperation with said flange.

7. In combination, a sheet metal piece having a round aperture, and a clinch-on nut comprising a drawn portion tapped to receive a screw, and extending through said aperture, a radially extending flange on said central portion contacting one side of said sheet metal around said aperture, spaced lugs struck from said flange and passing through said aperture around said central portion, said lugs being bent over the margin of said aperture and toward said flange whereby the portions of sheet metal lying directly under said lugs are distorted to render the nut immovable.

JOHN M. OLDHAM.